US012649177B2

(12) United States Patent
Adams

(10) Patent No.: US 12,649,177 B2
(45) Date of Patent: Jun. 9, 2026

(54) APPARATUS AND METHOD FOR CAPTURING CARBON IN SOIL

(71) Applicant: Bison Underground, LLC, Norman, OK (US)

(72) Inventor: Steven Michael Adams, Norman, OK (US)

(73) Assignee: Bison Underground, LLC, Norman, OK (US)

( * ) Notice: Subject to any disclaimer, the term of this patent is extended or adjusted under 35 U.S.C. 154(b) by 221 days.

(21) Appl. No.: 18/305,916

(22) Filed: Apr. 24, 2023

(65) Prior Publication Data

US 2023/0338998 A1 Oct. 26, 2023

Related U.S. Application Data

(60) Provisional application No. 63/364,960, filed on May 19, 2022, provisional application No. 63/333,928, filed on Apr. 22, 2022.

(51) Int. Cl.
| | |
|---|---|
| *A01D 41/06* | (2006.01) |
| *B09B 1/00* | (2006.01) |
| *B09B 3/35* | (2022.01) |

(52) U.S. Cl.
CPC .............. *B09B 1/008* (2013.01); *A01D 41/06* (2013.01); *B09B 3/35* (2022.01)

(58) Field of Classification Search
CPC ........... B09B 1/008; B09B 3/35; A01D 41/06; A01B 45/023; A01C 23/026
See application file for complete search history.

(56) References Cited

U.S. PATENT DOCUMENTS

| | | | |
|---|---|---|---|
| 2,514,890 | A | 7/1950 | McLemore |
| 2,649,061 | A | 8/1953 | Hawkins et al. |
| 2,782,740 | A | 2/1957 | Wood |

(Continued)

FOREIGN PATENT DOCUMENTS

| | | |
|---|---|---|
| JP | H07196389 A | 8/1995 |
| KR | 20170075215 A | 7/2017 |
| KR | 102228840 | 3/2021 |

OTHER PUBLICATIONS

Gemco Energy; "Crop Residue Pellet Mill"; All; Sep. 2019 (Year: 2019).*

(Continued)

*Primary Examiner* — Benjamin F Fiorello
(74) *Attorney, Agent, or Firm* — Dunlap Codding, P.C.

(57) ABSTRACT

An assembly and method for sequestrating carbon into a soil by grinding a crop waste into a ground material and converting the ground material into a plurality of pellets. The pellets are passed into the soil with a tine assembly or a trenching assembly. The tine assembly has a hollow, elongated body movable between a retracted position wherein a second end is spaced above the soil and an extended position wherein the second end is positioned a distance below the surface of the soil. A gate is pivotally connected to the second end of the elongated body to be movable between a closed position, wherein the gate retains the pellets in the elongated body, and an open position, wherein the gate is positioned away from the second end of the elongated body to permit passage of the pellets from the bore and into the soil.

7 Claims, 8 Drawing Sheets

(56) References Cited

U.S. PATENT DOCUMENTS

| | | | |
|---|---|---|---|
| 2,902,953 A * | 9/1959 | Young | A01G 29/00 |
| | | | 239/271 |
| 2,936,838 A | 5/1960 | Bonomo et al. | |
| 3,158,958 A | 12/1964 | Gould | |
| 3,170,421 A | 2/1965 | Norris et al. | |
| 3,504,647 A | 4/1970 | Krarup | |
| 3,606,848 A * | 9/1971 | Dobbs et al. | A01C 23/023 |
| | | | 172/462 |
| 3,685,469 A | 8/1972 | Rogers | |
| 3,716,005 A | 2/1973 | Fennell | |
| 3,842,764 A | 10/1974 | Bauer | |
| 3,986,463 A | 10/1976 | Houston et al. | |
| 4,141,676 A * | 2/1979 | Jannen | F04B 1/02 |
| | | | 417/539 |
| 4,178,860 A | 12/1979 | Hines et al. | |
| 4,248,548 A | 2/1981 | Danford | |
| 4,324,295 A | 4/1982 | Weichel | |
| 5,401,119 A | 3/1995 | Washington et al. | |
| 5,503,090 A | 4/1996 | Guzan | |
| 5,639,182 A | 6/1997 | Paris | |
| 5,830,752 A | 11/1998 | Bruso | |
| 6,059,447 A | 5/2000 | Paris | |
| 6,502,720 B2 | 1/2003 | Schwederski | |
| 6,782,834 B2 | 8/2004 | Winn | |
| 6,939,085 B1 | 9/2005 | Posch | |
| 6,997,122 B1 | 2/2006 | Guzman | |
| 7,721,662 B2 | 5/2010 | Way et al. | |
| 10,653,069 B2 * | 5/2020 | Farley | A01F 12/40 |
| 2002/0056554 A1 | 5/2002 | Hargreaves et al. | |
| 2009/0078435 A1 | 3/2009 | Meijerhof et al. | |
| 2010/0288518 A1 | 11/2010 | Reincke | |
| 2011/0024140 A1 | 2/2011 | De Bree | |
| 2020/0261847 A1 | 8/2020 | Wan et al. | |

OTHER PUBLICATIONS

International Search Report and Written Opinion dated Jul. 27, 2023 for PCT/US2023/066126; 12 pgs.

\* cited by examiner

120

162

160

168

166

174

171

172

164

169

170

171

172

160

170

169

APPARATUS AND METHOD FOR CAPTURING CARBON IN SOIL

CROSS-REFERENCE TO RELATED APPLICATIONS

This application claims priority to U.S. Provisional Application Ser. No. 63/333,928, filed Apr. 22, 2022, and to U.S. Provisional Application Ser. No. 63/364,960, filed May 19, 2022, the entire contents of each being hereby expressly incorporated herein by reference.

BACKGROUND

Farming is a vital part of the global economy but also a major producer of much carbon dioxide, adding to the mounting levels of carbon dioxide in our atmosphere. At the same time, soil provides an enormous potential reservoir for carbon. Estimates for the amount of carbon released into the atmosphere from farming practices, which degrade soil structure and health, range from 50 to 100 Gt. If carbon was able to be captured into the soil, the atmospheric carbon dioxide could be reduced from 420 ppm to 370 ppm over three decades.

In an ongoing survey among large-scale and small-scale farmers, it has been found that 86% of farmers leave behind crop waste after a harvest, adding to the amount of carbon in the atmosphere. The consequences of leaving crop waste behind after harvest include soil compaction, poor drainage, flooding, lack of carbon and nitrogen in the soil, and erosion.

Fifty percent of farmers are willing to spend between $5,000 and $10,000 annually to address the carbon issue affecting farming; however, no all-in-one solution exists. It has been debated that the broad adoption of regenerative agriculture practices alone could reduce atmospheric carbon dioxide on the Gigatonne scale; however, with soil degradation, this conversion is not widely accepted due to the risks of crop failure during transitional seasons. A solution to the increased atmospheric carbon dioxide is to reduce the barriers related to regenerative agriculture by accelerating the restoration of soil via the utilization of organic matter, thereby enhancing the conditions for crops.

To this end, a need exists for an assembly and method that will inject carbon-rich biomass material deep into agricultural soils. It is to such an assembly and method that the inventive concepts disclosed herein are directed. The base of this biomass material may be crop waste, such as leftover stalks and leaves of cash and cover crops. The assembly will transfer carbon captured via photosynthesis to the base of the topsoil, and as a result, the carbon will be integrated into the soil. The assembly and method are an improvement on current industrial and regenerative practices that either do not encourage the integration of crop waste into the soil and/or fail to sequester carbon deep enough into the soil. The assembly and method herein disclosed to increase soil health, crop yields, and water retention, supporting the growth of resilient crops to climate stress and pests, providing structural resiliency to the soil, and easing the agricultural transition from conventional to regenerative practices. Another benefit of the herein-disclosed inventive concepts is that the restored soil also retains the nutrients from soil organisms instead of receiving the nutrients from synthetic sprays, thereby reducing the harmful runoff of the synthetic sprays.

DETAILED DESCRIPTION OF EXEMPLARY EMBODIMENTS

The following detailed description refers to the accompanying drawings. The same reference numbers in different drawings may identify the same or similar elements.

The present disclosure describes an assembly and method for the sequestration of carbon into a soil of a land plot.

As used herein, the terms "comprises," "comprising," "includes," "including," "has," "having," or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Further, the use of the term "plurality" is meant to convey "more than one" unless expressly stated to the contrary.

As used herein, qualifiers like "substantially," "about," "approximately," and combinations and variations thereof are intended to include not only the exact amount or value that they qualify but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity of more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items, positions, examples, embodiments, or the like, and, unless explicitly stated otherwise, is not meant to imply any sequence or order or importance to one item over another or any order of addition.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
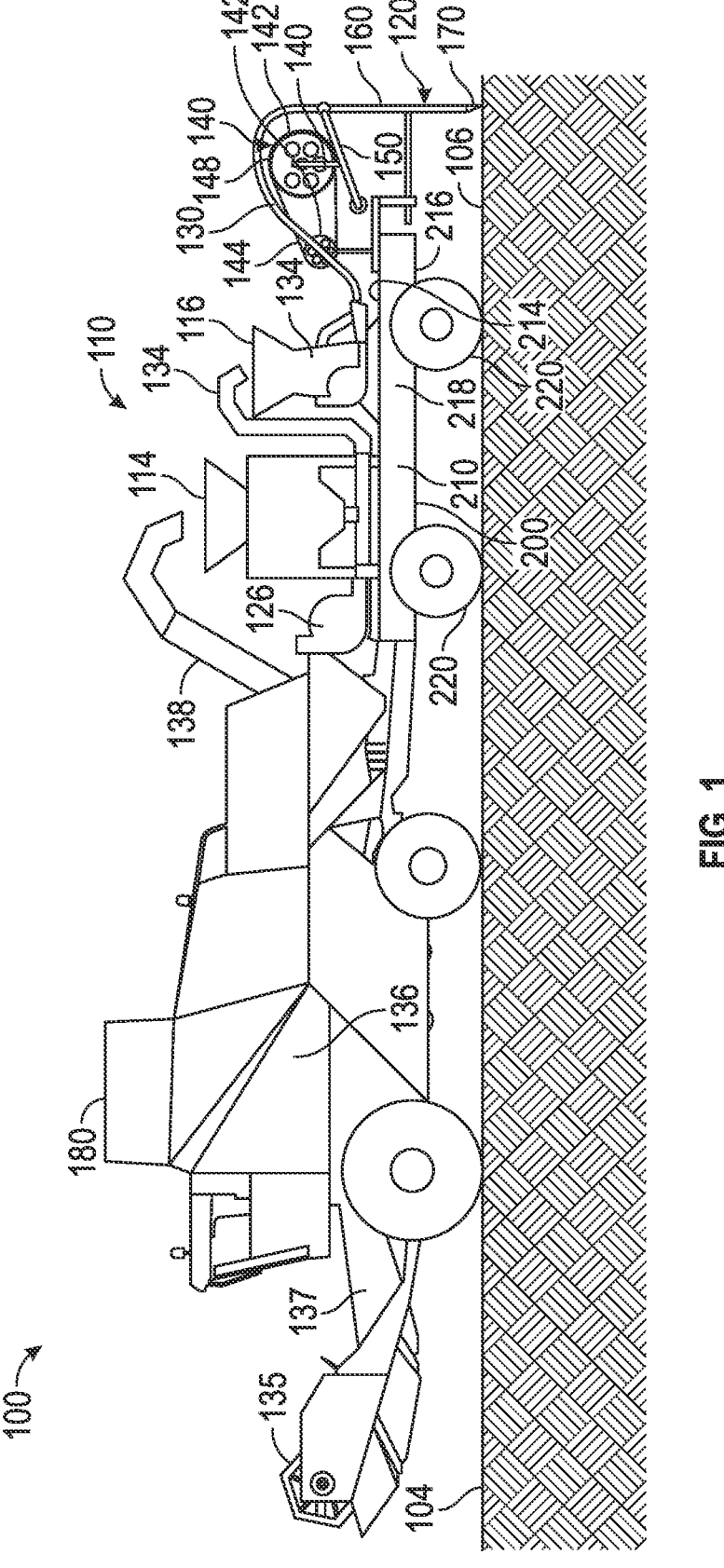
FIG. 1 is a diagrammatic illustration of an exemplary embodiment of an assembly for the sequestration of carbon into a soil of a land plot in accordance with the inventive concepts disclosed herein.
Figure 2:
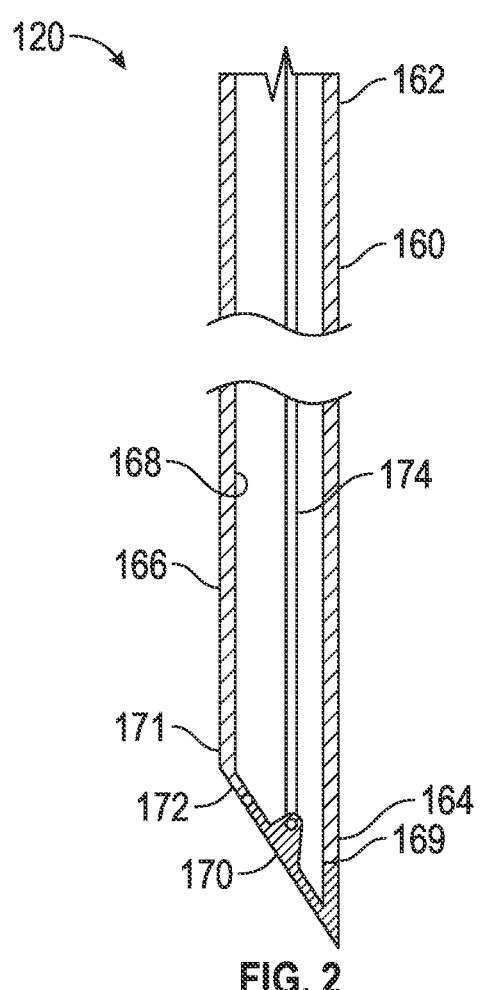
FIG. 2 is a diagrammatic illustration of a portion of an exemplary tine assembly in a closed position.
Figure 3:
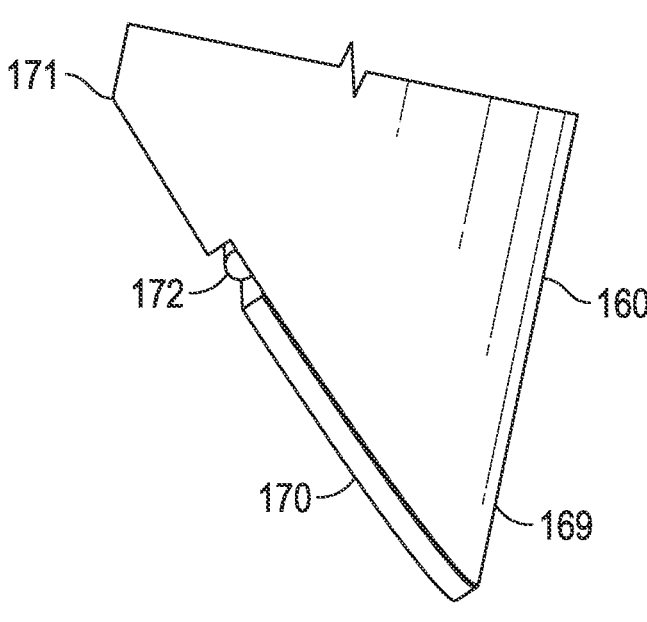
FIG. 3 is a perspective view of a lower portion of the tine assembly of FIG. 2.

Referring now to the drawings, FIG. 1 illustrates a diagrammatic, side view of an exemplary assembly 100 for the sequestration of carbon into a soil 104 of a land plot 106 in accordance with the inventive concepts disclosed herein. The assembly 100 for the sequestration of carbon into the soil 104 may have a material converting assembly 110 comprising a grinder 114, a pelletizer 116 connected to the grinder 114, and at least one tine assembly 120 connected to the pelletizer 116. The grinder 114 may be utilized for grinding a waste biomass, such as a crop waste, into a ground material, wherein the ground material may be transferred to the pelletizer 116. As used herein, "ground material" may mean a material that is cut, mashed, mulched, blended, slurried, or otherwise reduced in size. Examples of crop waste may include stalks, leaves, and cover crops. In some non-limiting embodiments, the grinder 114 may be a hammer mill or the like. The pelletizer 116 may be positioned to receive the ground material from the grinder 114, wherein the pelletizer 116 may convert the ground material into a plurality of pellets 122 (FIGS. 5A-5C, and 5E). In some non-limiting embodiments, the pelletizer 116 may be a pellet mill or the like. The tine assembly 120 may be in fluid communication with the pelletizer 116 for receiving the pellets 122. In some non-limiting embodiments, the material converting assembly 110 may also have at least one first pathway 124 positioned between the grinder 114 and the pelletizer 116, a first blower 126 for transferring the ground material from the grinder 114 to the pelletizer 116 via the first pathway 124, at least one second pathway 130 positioned between the pelletizer 116 and the tine assembly 120, and a second blower 134 for transferring the plurality of pellets 122 from the pelletizer 116 to the tine assembly 120 via the second pathway 130.

In one non-limiting embodiment, the material converting assembly 110 may be used in combination with a harvesting combine 180. The harvesting combine 180 may have a header 135, a threshing assembly 136, a transfer assembly 137 for connecting the header 135 to the threshing assembly 136, and an emission pathway 138 attached to the threshing assembly 136. The header 135 gathers the crop positioned on the land plot 106 and transfers the crop to the transfer assembly 137. The transfer assembly 137 transfers the crop to the thresher assembly 136 where the thresher assembly 136 separates the crop waste from the crop. The thresher assembly 136 transfers the crop waste to the material converting assembly 110 via the emission pathway 138. In one embodiment, the harvesting combine 180 may have a gathering bin (not shown) attached to the threshing assembly 136 in which at least one grain, or the like, when separated from the crop, may be disposed. In other non-limiting embodiments, the harvesting combine 180 may gather the crop waste (i.e., the crop waste has already been cut) from the land plot 106, wherein the transfer assembly 137 transfers the crop waste to the threshing assembly 136, and the threshing assembly 136 transfers the crop waste to the material converting assembly 110 through the emission pathway 138.

Harvesting combines are well known in the art. Thus, no further description of the harvesting combine is believed necessary to enable one skilled in the art to understand the construction and operation of the material converting assembly 110.

In one non-limiting embodiment, the material converting assembly 110 may have a transport device 200. The transport device 200 may be in the form of a transport platform 210. The transport platform 210 may have a top surface 214 supported by a frame 216. In turn, the frame 216 may be supported by a plurality of wheels 220. The wheels 220 may be rotatably associated with the transport platform 210 in any desired manner and may be configured to move the transport platform 210 over a surface, such as the soil 104 of the land plot 106, for example. It is to be understood that any number of wheels 220 may be implemented with the inventive concepts disclosed herein, while in some exemplary embodiments, the wheels 220 may be omitted. The transport device 200 may be connected to the harvesting combine 180 so the harvesting combine 180 pulls the transport device 200 along the land plot 106. Alternatively, a different vehicle, such as a truck or tractor, may be connected to the transport device 200 and used to pull the transport device 200 along the land plot 106.

The tine assembly 120 may have at least one rotation assembly 140 having at least two mechanical wheels 142, at least one connecting member 144 connecting the at least two wheels 142, a first arm 146 connected via a fastener 148 to one of the mechanical wheels 142, and a second arm 150 connected to the first arm 146 and at least one elongated body 160 connected to the rotation assembly 140. The fastener 148 may be a screw, a connecting rod, or the like.

Referring to FIGS. 2-4, and 5A-6E, the elongated body 160 of the tine assembly 120 is an elongated, hollow tubular structure that has a first end 162, a second end 164, a side wall 166 extending between the first end 162 and the second end 164, and defining a bore 168 extending therethrough from the first end 162 of the elongated body 160 to the second end 164. The elongated body 160 may have any length and diameter suitable for transporting crop waste, whether ground or pelletized, into the soil 104. Further, it will be appreciated that any number of elongated bodies 160 may be used.

To facilitate the insertion of the tine assembly 120 into the soil, the second end of the elongated body 160 may be angled so a leading edge 169 and a trailing edge 171 is formed. The angle may be varied depending on the hardness of the soil the tine assembly 120 is inserted. In one embodiment, the second end 164 of the elongated body 160 may be angled at approximately 45 degrees relative to a longitudinal axis of the elongated body 160.

Figure 4:
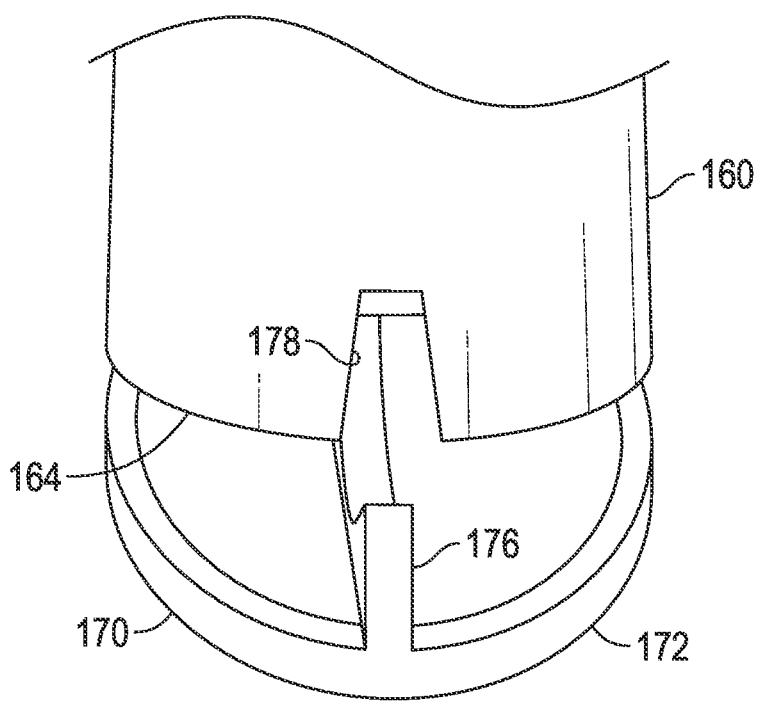
FIG. 4 is a bottom perspective view of the tine assembly of FIG. 2 shown in an open position.
Figures 5A, 5B, 5C, 5D:
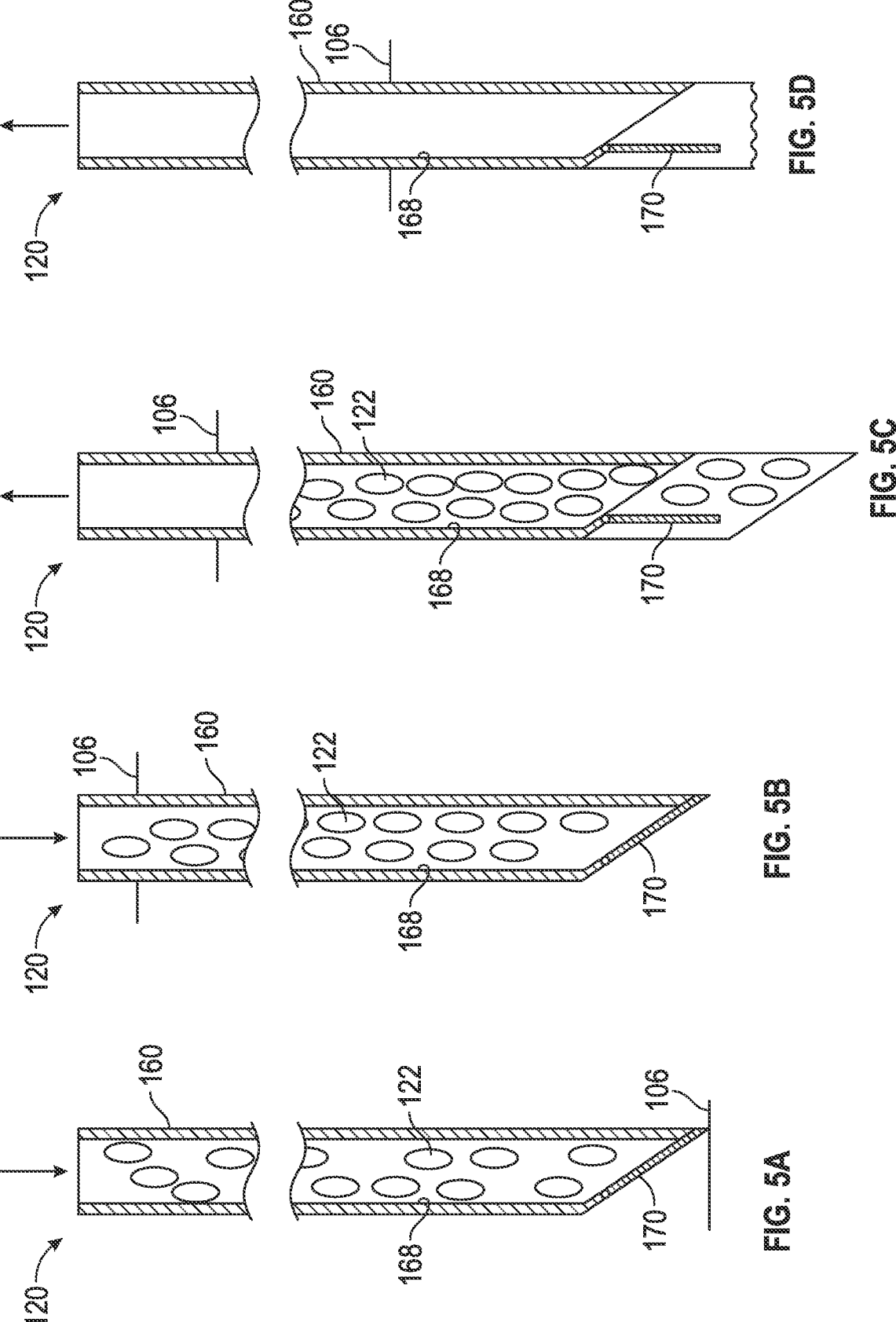
FIG. 5A is a diagrammatic illustration of the tine assembly shown in the closed position positioned above the soil of the land plot.
FIG. 5B is a diagrammatic illustration of the tine assembly shown in the closed position with a plurality of pellets disposed within the tine assembly and inserted in the soil of the land plot.
FIG. 5C is a diagrammatic illustration of the tine assembly being withdrawn from the soil of the land plot and in an open position so the pellets pass into the soil of the land plot.
FIG. 5D is a diagrammatic illustration of the tine assembly shown withdrawn from the soil of the land plot with the pellets discharged from the tine assembly.

The tine assembly 120 includes a gate 170. The gate 170 is pivotally connected to the second end 164 of the elongated body 160, so the gate 170 is movable between a closed position (FIGS. 2, 5A, and 5B) and an open position (FIGS. 4, 5C, and 5D). In some non-limiting embodiments, the gate 170 may be pivotally connected to the second end 164 of the elongated body 160 via a spring hinge 172, so the second portion of the gate 170 is biased in the closed position.

The gate 170 may be moved from the closed position to the open position in a variety of ways. In one embodiment, the gate may be moved with a linkage 174 having one end connected to the gate 170 and another end connected to a switch (not shown). Upon activating the switch, the linkage 174 causes the gate 170 to move to the open position. Upon deactivating the switch, the spring hinge 172 causes the gate 170 to move to the closed position. While the gate 170 has been described as being operated with a mechanical device, it will be appreciated by those of ordinary skill in the art that other types of mechanisms may be utilized to move the gate 170 between the closed position and the open position, including pneumatic, hydraulic, or electrical devices.

Figure 5E:
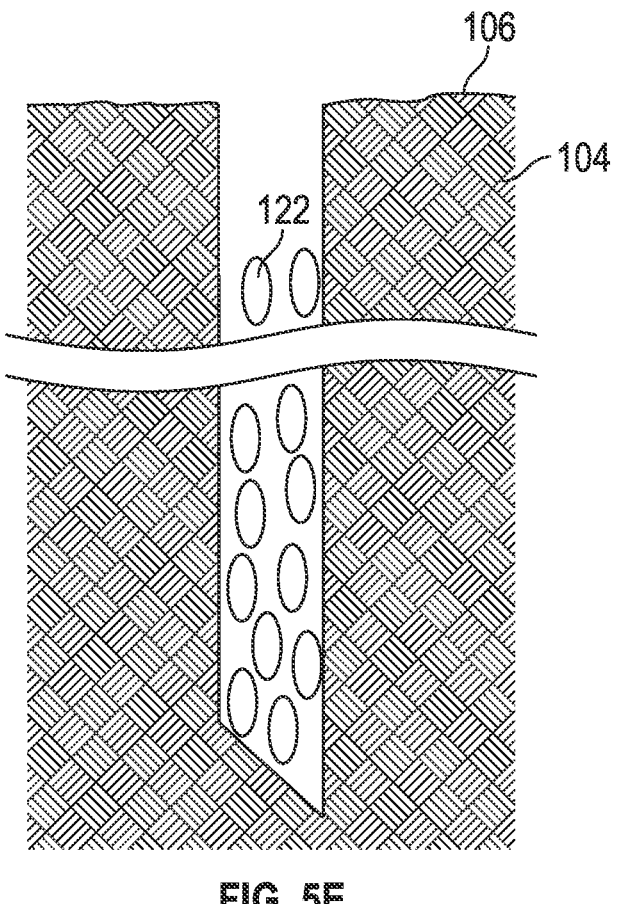
FIG. 5E is a diagrammatic illustration of the pellets shown positioned in the soil of the land plot.

The gate 170 may be pivotally connected to the second end of the elongated body 160 to be movable between the closed position (FIGS. 2, 6A, and 6B), wherein the gate 170 retains the crop waste, such as pellets 122, in the elongated body 160 and the open position (FIGS. 6C and 6D) wherein the gate 170 is positioned away from the second end 164 of the elongated body 160 to permit passage of the pellets 122 from the bore 168 and into the soil 104 (FIG. 5E).

The gate 170 may include a protrusion or tooth 176 that is mateable with a notch 178 provided in the lower end 164 of the elongated body 160 when the gate 170 is in the closed position. The mating of the tooth 176 with the notch 178 provides lateral stability to the gate 170 during insertion of the tine assembly 120 into the soil 104.

The rotation assembly 140 may move the elongated body 160 of the tine assembly 120 between a retracted position (FIG. 5A), wherein the second end 164 of the tine assembly 120 is spaced above a surface of the land plot 106, including the soil 104, and an extended position (FIG. 5B), wherein the second end 164 of the tine assembly 120 is inserted a distance below the surface of the land plot 106 in the soil 104. While a mechanical assembly has been illustrated for moving the tine assembly 120 between the retracted position and the extended position, it will be appreciated that other types of mechanisms may be utilized to move the tine assembly 120 between the retracted position and the extended position, including pneumatic, hydraulic, or electrical devices.

In use, a method for the sequestration of carbon into the soil 104 generally comprises grinding the crop waste step into a ground material, converting the ground material into a plurality of pellets 122, and transferring the plurality of pellets 122 into the soil 104 of the land plot 106. In another non-limiting embodiment, upon the material converting assembly 110 receiving the crop waste, the grinder 114 of the material converting assembly 110 grinds the crop waste into a ground material. In one non-limiting embodiment, the grinder 114 is a hammer mill or the like. The ground material is transferred from the grinder 114 to the pelletizer 116. In some embodiments, the ground material may be transferred to the pelletizer 116 via at least one pathway 124 and a first blower 126. The pelletizer 116 receives the ground material and converts the ground material into a plurality of pellets 122. In some non-limiting embodiments, the pelletizer 116 may be a pellet mill or the like. The plurality of pellets 122 is transferred to the elongated body 160 of the tine assembly 120 from the pelletizer 116. The plurality of pellets 122 may be transferred to the bore 168 of the elongated body 160 of the tine assembly 120 via at least one pathway and a second blower 134 (FIG. 5A).

A portion of the tine assembly 120 having the gate 170 pivotally connected to the second end 164 of the elongated body 160 may be inserted into the soil 104 of the land plot 106 (FIG. 5B). Upon removal of a portion of the tine assembly 120 from the soil 104 of the land plot 106 (FIG. 5C), the gate 170 of the tine assembly 120 is moved to the open position (i.e., positioned away from the second end 164 of the elongated body 160 of the tine assembly 120) (FIG. 5C), thereby permitting a plurality of pellets 122 to be positioned in the soil 104 of the land plot 106. FIG. 5D illustrates the pellets 122 having been discharged from the elongated body 160 of the tine assembly 120, and FIG. 5E illustrates the pellets 122 disposed in the soil 104 with the tine assembly 120 removed from the soil 104. In some non-limiting embodiments, the portion of the tine assembly 120 may be inserted into the soil 104 of the land plot 106 to a depth of about 12 inches to about 36 inches below the surface of the land plot 106.

In some non-limiting embodiments, the crop waste may be gathered by a harvester combine 180, tractor, or the like, wherein the harvester combine 180 moves through the crop positioned on the land plot 106, wherein the header 135 of the harvester combine 180 gathers the crop from the land plot 106. The transfer assembly 137 of the harvester combine 180 transfers the crop from the header 135 to the thresher assembly 136. The thresher assembly 136 then removes the crop waste from the crop. The crop waste is transferred from the thresher assembly 136 to the material converting assembly 110 via the emission pathway 138. In another non-limiting embodiment, the harvester combine 180 may move through the crop waste remaining on the land plot 106 after the harvest of a crop. The header 135 of the harvester combine 180 gathers the crop waste from the land plot 106. The transfer assembly 137 of the harvester combine 180 transfers the crop waste from the header 135 to the thresher assembly 136. The crop waste is transferred to the material converting assembly 110 via the emission pathway 138.

In other non-limiting embodiments, the ground material may be transferred to the bore 168 of the elongated body 160 of the tine assembly 120. The portion of the tine assembly 120 having the gate 170 pivotally attached to the second end of the elongated body 160 may be inserted into the soil 104 of the land plot 106. Upon removal of the portion of the tine assembly 120 having the gate 170 pivotally connected to the second end 164 of the elongated body 160 of the tine assembly 120 from the soil 104 of the land plot 106, the gate 170 of the tine assembly 120 is positioned away from the second end of the elongated body 160 of the tine assembly 120, thereby permitting the ground material to be positioned in the soil 104 of the land plot 106.

In some non-limiting embodiments, the method may be performed quarterly, semi-annually, or annually. In some non-limiting embodiments, the method of having the crop waste inserted into the soil 104 may be alternated with a method for inserting a cover crop material into the soil 104. A method for inserting a cover crop into the soil 104 may include grinding the cover crop into a ground material, converting the ground material into a plurality of pellets 122, transferring the plurality of pellets 122 into the bore of the elongated body 160 of the tine assembly 120, inserting a portion of the tine assembly 120 into the soil 104 of the land plot 106, removing the portion of the tine assembly 120 from the soil 104, and positioning the plurality of pellets 122 in the soil 104 of the land plot 106 as the tine assembly 120 is being removed from the soil 104. Another method for inserting the cover crop material into the soil 104 comprises grinding the cover crop into a ground material, transferring the ground material into the bore of the elongated body 160 of the tine assembly 120, inserting a portion of the tine assembly 120 into the soil 104 of the land plot 106, removing the portion of the tine assembly 120 from the soil 104, and positioning the ground material in the soil 104 of the land plot 106 as the tine assembly 120 is being removed from the soil 104. A cover crop may be a grass, such as ryegrass, barley, or the like; a legume, such as alfalfa, clover, or the like; brassicas, such as radish, turnip, or the like; and a broadleaf non-legume, such as spinach, flax, or the like.

Figure 6:
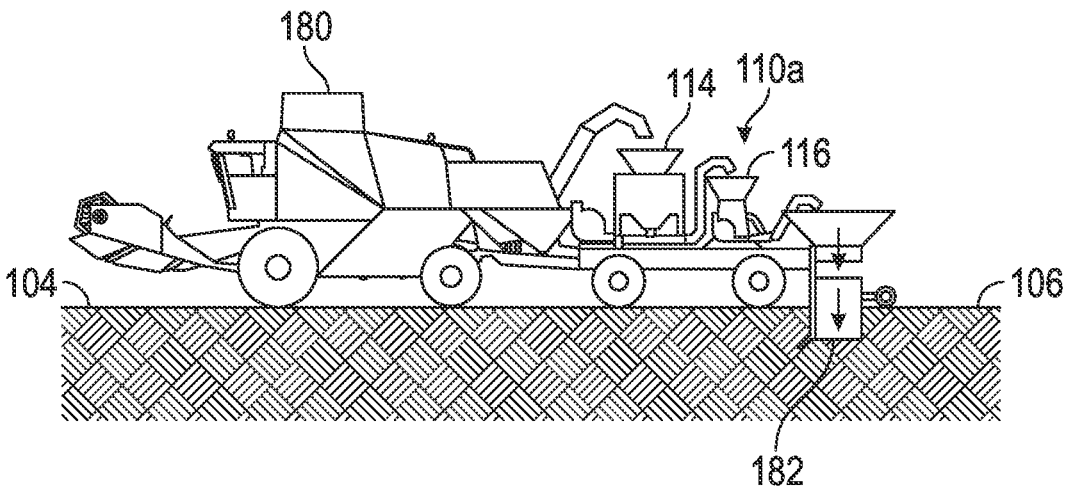
FIG. 6 is a diagrammatic illustration of another exemplary embodiment of an assembly for the sequestration of carbon into a soil of a land plot in accordance with the inventive concepts disclosed herein.
Figure 7A:
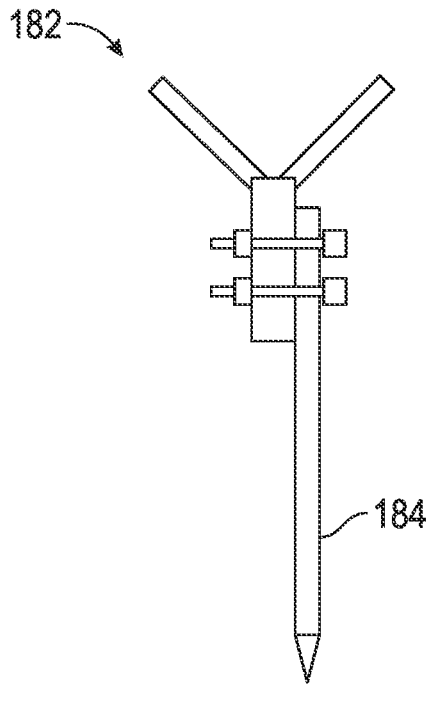
FIG. 7A is a rear elevational view of a trencher.
Figure 7B:
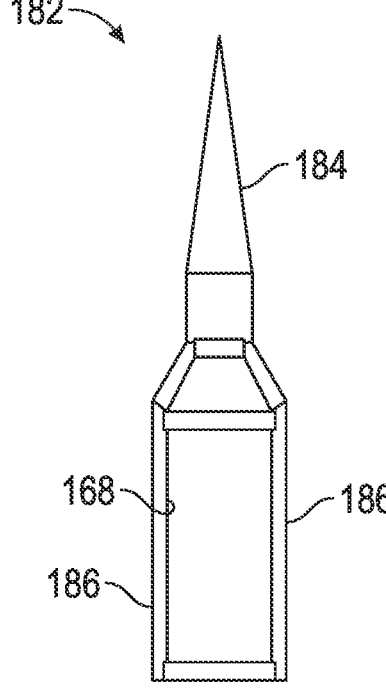
FIG. 7B is a top view of the trencher.

Referring now to FIGS. 6, 7A, and 7B, in another non-limiting embodiment, the method for the sequestration of carbon into the soil 104 of the land plot 106 may comprise grinding crop waste into a ground material via the grinder 114, converting the ground material into a plurality of pellets 122 via the pelletizer 116, forming an opening in the soil 104 of the land plot 106 using a material converting assembly 110a that is similar to the material converting assembly 110 described above, except the material converting assembly 110a includes a trenching device 182 for making an opening in the soil 104, and positioning the plurality of pellets 122 in the opening of the soil 104.

FIGS. 7A and 7B illustrate the trenching device 182. The trenching device 182 may include a leading edge 184 effective to cut a trench when lowered into the ground and drawn therethrough, and a pair of plates 186 spaced apart and extending behind the leading edge 184. The plates 186 are spaced apart so as to form an enclosure 188 behind the leading edge 184 for holding the trench open so the crop waste can be deposited into the soil 104. The shape of the trenching device 182 is not critical, and a variety of forms of both the leading edge 184 and the plates 186 may be employed. Without being limited thereto, suitable alternative trenching devices having chisels are described, for example, by Washington, et al. (U.S. Pat. No. 5,401,119); Finn (U.S. Pat. No. 2,949,871); and Bonomo et al. (U.S. Pat. No. 2,936,838), the contents of each of which are hereby incorporated herein by reference. In other non-limiting embodiments, the trenching device may be a shovel, a spade, a trowel, or the like.

Figure 8:
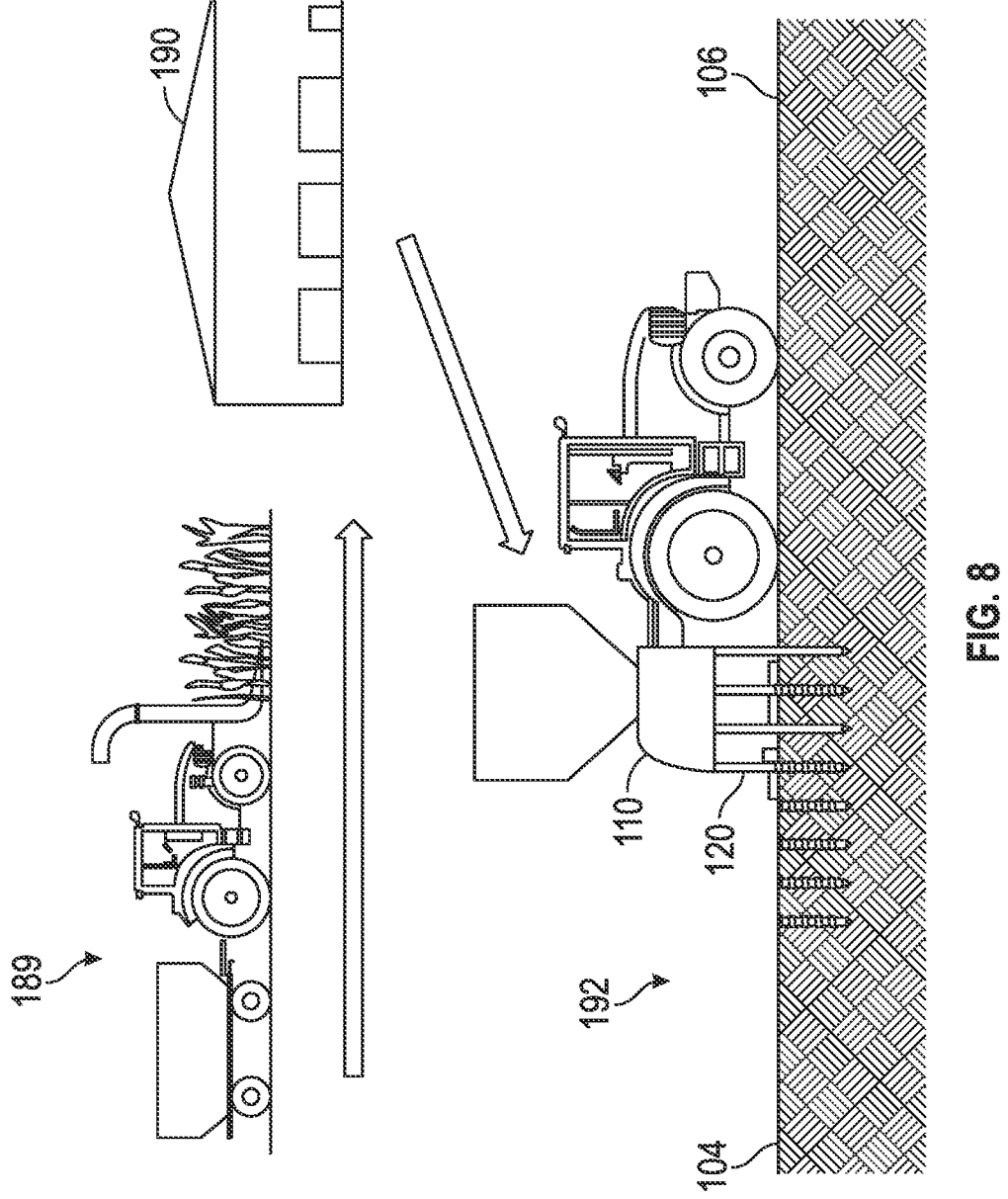
FIG. 8 is a diagrammatic illustration of another exemplary embodiment of an assembly for the sequestration of carbon into a soil of a land plot in accordance with the inventive concepts disclosed herein.
Figure 9:
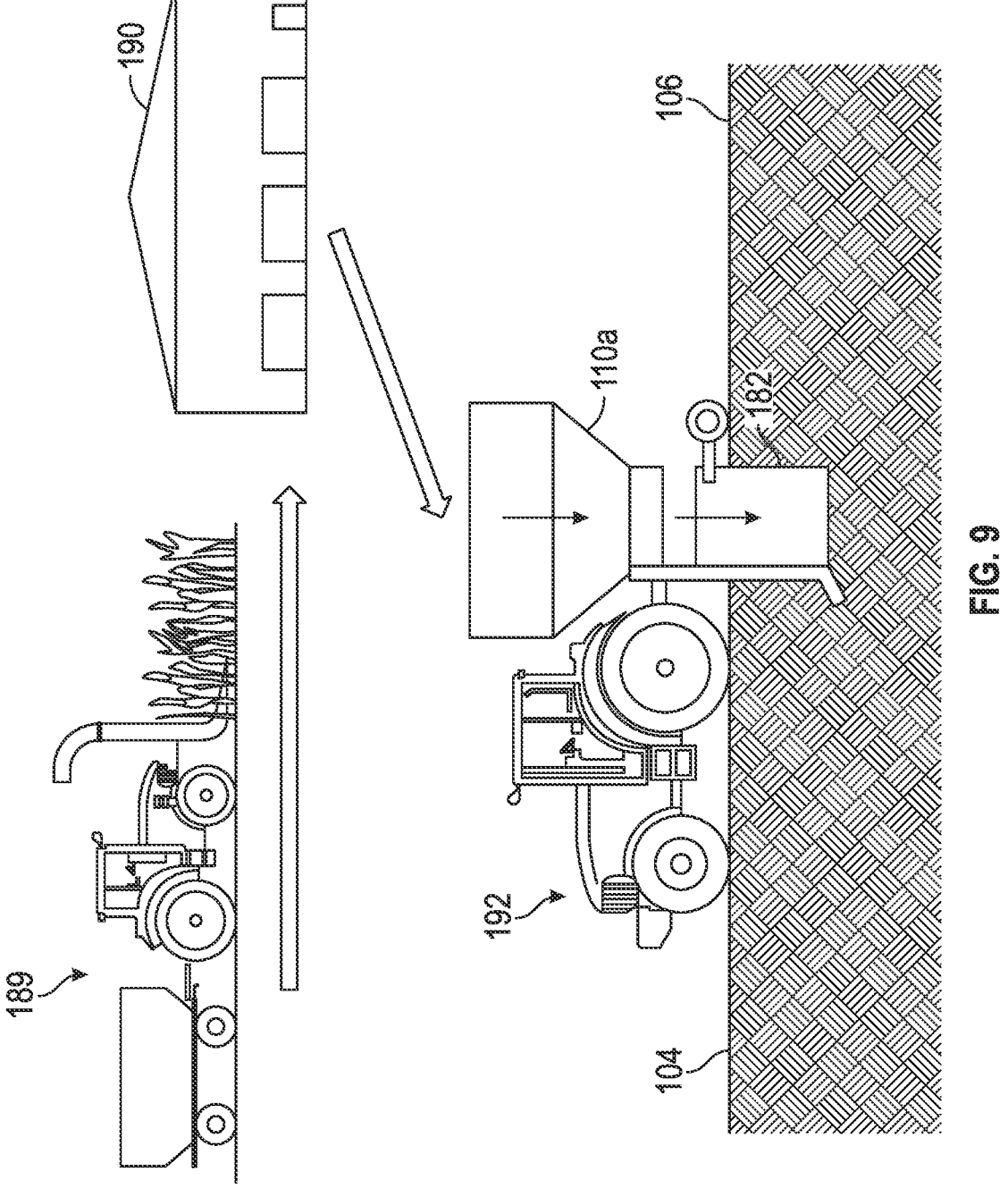
FIG. 9 is a diagrammatic illustration of another exemplary embodiment of an assembly for the sequestration of carbon into a soil of a land plot in accordance with the inventive concepts disclosed herein.

Referring to FIGS. 8 and 9, in another non-limiting embodiment, the method for the sequestration of carbon into the soil 104 of the land plot 106 may comprise obtaining the crop waste from an origination site 189, transporting the grinding crop waste to a selected remote location 190 where the grinding crop waste is processed a plurality of pellets, such as the pellets 122, and transporting the pellets to an injection site 192. The origination site 189 and the injection site 190 may be the same site or a different site. The pellets 122 may then be injected or otherwise disposed of at the injection site 192 upon forming an opening in the soil 104 of the land plot 106 as described herein. FIG. 8 illustrates the pellets 122 being injected at the injection site 192 with the material converting assembly 110 that includes the tine assembly 120. FIG. 9 illustrates the pellets 122 being injected at the injection site 192 with material converting assembly 110a that includes the trenching device 182.

In other non-limiting embodiments, the method for the sequestration of carbon into the soil 104 of the land plot 106 may comprise routing loose or non-pelletized crop waste into an opening in the soil 104 of the land plot 106 upon forming an opening in the soil 104 of the land plot 106 as described herein. The apparatuses and methods described herein may also be used for injecting materials that are not necessarily carbon focused but for the delivery of other materials, such as microbes and nutrients for stimulating microbial activity for the removal of harmful chemicals, such as fuel, from soil.

Although the presently disclosed inventive concepts have been described in conjunction with the specific language set forth herein, many alternatives, modifications, and variations will be apparent to those skilled in the art. Accordingly, it is intended to embrace all such alternatives, modifications, and variations that fall within the spirit and broad scope of the presently disclosed inventive concepts. Changes may be made in the construction, and the operation of the various components, elements, and assemblies described herein without departing from the spirit and scope of the presently disclosed and claimed inventive concepts.

What is claimed is:

1. A method for the sequestration of carbon into a soil of a land plot, comprising:
   providing a plurality of pellets formed from crop waste;
   providing at least one tine assembly having a bore;
   transferring the plurality of pellets into the bore of the tine assembly;
   inserting at least a portion of the tine assembly into the soil to form an opening in the soil; and
   depositing the plurality of pellets into the opening upon withdrawal of the portion of the tine assembly from the soil.

2. The method of claim 1, wherein inserting the portion of the tine assembly into the soil of the land plot is at a depth of about 12 inches to about 36 inches below a surface of the land plot.

3. The method of claim 1, wherein the crop waste is obtained from a first location, and wherein the method further comprises:
   transporting the crop waste to a second location that is remote from the first location;
   grinding the crop waste into a ground material at the second location;
   converting the ground material into the plurality of pellets at the second location; and
   transporting the plurality of pellets to the first site, wherein the tine assembly is at the first site.

4. The method of claim 1, wherein the crop waste is obtained from a first location, and wherein the method further comprises:
   transporting the crop waste to a second location that is remote from the first location;
   grinding the crop waste into a ground material at the second location;
   converting the ground material into the plurality of pellets at the second location; and
   transporting the plurality of pellets to a third site that is different than the first site, wherein the tine assembly is at the third site.

5. The method of claim 4, wherein inserting the portion of the tine assembly into the soil of the land plot is at a depth of about 12 inches to about 36 inches below a surface of the land plot.

6. The method of claim 1, further comprising:
   gathering a crop from the land plot;

separating the crop waste from the crop prior to grinding the crop waste;

grinding the crop waste into a ground material; and converting the ground material into the plurality of pellets.

7. The method of claim 1, wherein the portion of the tine assembly includes an elongated body defining the bore and a gate pivotally connected to one end of the elongated body, the gate movable between a closed position to retain the pellets and an open position to permit passage of the pellets, and wherein the depositing step occurs when the gate is in the open position.

* * * * *